United States Patent

Nakagishi et al.

Patent Number: 5,920,140
Date of Patent: Jul. 6, 1999

[54] GALVANO MIRROR UNIT

[75] Inventors: Toshio Nakagishi, Saitama-ken; Suguru Takishima; Hiroshi Yamamoto, both of Tokyo, all of Japan

[73] Assignee: Asahi Kogaku Kogyo Kabushiki Kaisha, Tokyo, Japan

[21] Appl. No.: 09/100,897

[22] Filed: Jun. 22, 1998

[30] Foreign Application Priority Data

Jun. 27, 1997 [JP] Japan ................................. 9-172060
Nov. 12, 1997 [JP] Japan ................................. 9-326937

[51] Int. Cl.$^6$ ................ H01R 39/00; H02K 11/00; G02B 26/08; F16C 17/04

[52] U.S. Cl. ................ 310/219; 310/71; 310/90; 310/67 R; 310/261; 359/198; 384/246

[58] Field of Search ....................... 310/219, 231, 310/232, 234, 254, 258, 259, 261, 262, 154, 66, 67 R, 90, 71, 229, 230, 46, 236, 237, 238, 239, 240, 241, 242, 244, 246, 248, 249; 359/198, 199, 200; 384/107, 173, 115, 124, 110, 246, 228; 360/102, 103, 106

[56] References Cited

U.S. PATENT DOCUMENTS

| | | | |
|---|---|---|---|
| 3,244,917 | 4/1966 | Gute | 310/154 |
| 4,088,914 | 5/1978 | Aoki | 310/264 |
| 4,351,596 | 9/1982 | Ohniwa et al. | 396/463 |
| 5,254,893 | 10/1993 | Ide | 310/90 |
| 5,461,498 | 10/1995 | Iwao | 359/200 |
| 5,608,280 | 3/1997 | Tamemoto et al. | 310/239 |
| 5,610,752 | 3/1997 | Hayakawa | 359/198 |
| 5,625,244 | 4/1997 | Bradfield | 310/232 |
| 5,705,868 | 1/1998 | Cox et al. | 310/71 |

*Primary Examiner*—Nestor Ramirez
*Assistant Examiner*—Dang Dinh Le
*Attorney, Agent, or Firm*—Greenblum & Bernstein P.L.C.

[57] ABSTRACT

A galvano mirror is held by a mirror holder. The mirror holder is rotatable about a rotation axis and supported in a stator. A center pins (made of conductive material) are provided to the stator. A pair of receive members (made of conductive material) are provided to the mirror holder. Each of the receive member receiving respective center pin. A pair of coils are provided to opposing ends of the mirror holder, the movable parts being connected to the receive members. The center pins and the receive members constitute a electrical feeding path for feeding electricity to the coils.

20 Claims, 10 Drawing Sheets

GALVANO MIRROR UNIT

BACKGROUND OF THE INVENTION

This invention relates to an optical disk drive.

Generally, an optical disk drive writes and reads data on an optical disk by means of a laser beam. The optical disk drive includes a light source module that emits the laser beam and an optical head carrying an objective lens that converges the laser beam on a small light spot on the optical disk.

The tracking operation of the optical disk drive includes (1) a rough tracking operation and (2) a fine tracking operation. The rough tracking operation is accomplished by moving the optical head crossing the tracks of the optical disk. The fine tracking operation is accomplished by minutely moving the light spot on the optical disk. For this purpose, a galvano mirror is provided in a light path between the light source module and the objective lens. By rotating the galvano mirror, the angle of incidence of the laser beam incident on the objective lens is changed, so that the light spot on the optical disk is moved.

Generally, a galvano mirror is mounted to a rotatable mirror holder. The mirror holder is accommodated in a stator. In order to rotate the mirror holder, coils are provided to opposing ends of the mirror holder. Magnets are provided to the stator so that the magnets are faced with the coils. The galvano mirror is rotated by an electromagnetic induction caused by current flow in the coils and a magnetic field caused by the magnets.

For feeding electricity to the coils of the mirror holder, the coils are connected to terminals (provided on the stator) via wires. The wires are laid between the mirror holder and the stator. Thus, when the galvano mirror is rotated, it causes a deformation (bending or twisting) of the wires. Such deformation of the wires may disturb the rotation of the galvano mirror.

Accordingly, there is a strong demand of a galvano mirror unit having an electrical feeding path which does not disturb the rotation of a galvano mirror.

SUMMARY OF THE INVENTION

It is therefore an object of the present invention to provide a galvano mirror unit having an electrical feeding path which does not disturb the rotation of a galvano mirror.

According to one aspect of the present invention, there is provided a galvano mirror unit including a galvano mirror, a mirror holder which holds the galvano mirror, a stator in which the mirror holder is rotated about a rotation axis, a pair of coils provided to opposing ends of the mirror holder, and a pair of pivoting supports which pivotably support the mirror holder. The pivoting supports sandwich the mirror holder therebetween in a direction of the rotation axis. Each pivoting support comprises a stationary part provided to the stator and a movable part provided to the mirror holder. Each of the stationary part and the movable part includes conductive material. The stationary part and the movable part contact with each other so that the stationary part and the movable part are electrically connected. The movable parts are connected to the coils. The movable parts and the stationary parts constitute a electrical feeding path for feeding electricity to the coils.

As constructed above, since the stationary parts and the movable parts constitute a electrical feeding path, it is not necessary to lay wires between the mirror holder and the stator. Thus, the rotation of the galvano mirror is not disturbed by the wires.

In a particular arrangement, the stationary part includes a center pin. The movable part includes a receive member which receives the center pin. Particularly, the center pin has a rounded tip, while the receive member having conical surfaces. The rounded tip of the center pin contacts the conical surfaces of the receive member. With such an arrangement, the deviation of the rotation axis of the mirror holder is prevented in a simple manner.

Further, the stationary part and the movable part are supported by insulation members. With this, a short-circuit is surely prevented.

In particular, it is preferred to provide a biasing member to the stator. The biasing member urges the pivoting supports in a direction of the axis, thereby to remove backlash of the pivoting axis.

In a preferred embodiment, each coil includes first and second lead wires. The first lead wires of the coils are connected to a common terminal provided on the mirror holder. The second lead wires of the coils are respectively connected to the stationary parts.

According to another aspect of the present invention, there is provided a galvano mirror unit including a galvano mirror, a mirror holder which holds the galvano mirror, a stator in which the mirror holder is rotated about a rotation axis, a pivoting arrangement which pivotably supports the mirror holder. A pair of coils are provided to opposing ends of the mirror holder. A pair of connector pins are provided to the mirror holder and so that the contact pins are connected to the coil. A pair of connector plates are provided to the stator. The connector plates respectively contact the connector pins. Each connector plate has an area so as to cover a moving range of the connector pin.

As constructed above, since the connector pins and the connector plates constitute an electrical feeding path for feeding electricity to the coils, it is not necessary to lay wires between the mirror holder and the stator. Thus, the rotation of the galvano mirror is not disturbed by the wires.

In a particular arrangement, the connector pins are provided on one of end surfaces of the mirror holder in a direction of the rotation axis. In such case, the connector plates are provided on an outer surface of the stator. The stator has openings which allow the connector pins to project to the outer surface of the stator. With such an arrangement, the connector plates can be concentrated on one surface (for example, a top surface) of the stator.

It is preferred that the connector plates urge the connector pins in a direction of the rotation axis. With this, a backlash between the stationary part and the movable part of each pivoting support is eliminated.

Optionally, the pivoting arrangement includes a pair of center pins (made of conductive material) provided to the stator and a pair of receive members (made of conductive material) provided to the mirror holder. Each receive member receives respective center pin.

DESCRIPTION OF THE PREFERRED EMBODIMENT

First, an optical disk drive to which the first to second embodiments of the present invention are embodied is described.

Figure 1:
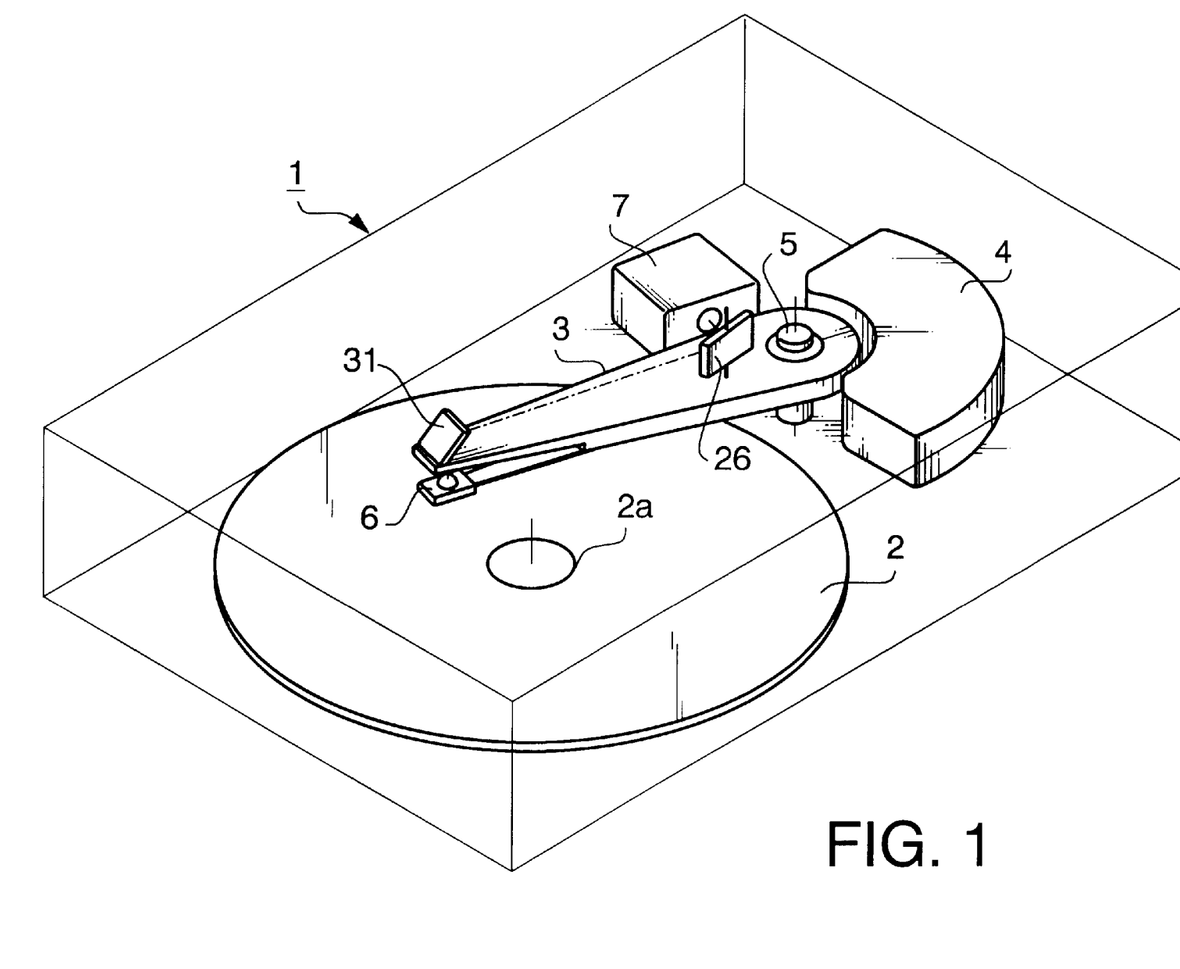
FIG. 1 is a perspective view of an optical disk drive to which first and second embodiments of the present invention are embodied.

FIG. 1 is a perspective view of the optical disk drive (hereinafter, the disk drive 1). The disk drive 1 is arranged to write and read data on an optical disk 2 by means of a so-called Near Field Recording (NFR) technology.

In the disk drive 1, the optical disk 2 is mounted to a rotating shaft 2a of a not-shown spindle motor. The disk drive 1 includes a rotary arm 3 extending in parallel to a surface of the optical disk 2, and is rotatably supported by a shaft 5. A floating head 6 that carries an optical lens (described later) is provided to a tip of the rotary arm 3. When the rotary arm 3 is rotated, the floating head 6 moves across tracks formed on the optical disk 2. The rotary arm 3 is further provided with a light source module 7 in the vicinity of the shaft 5.

Figure 2:
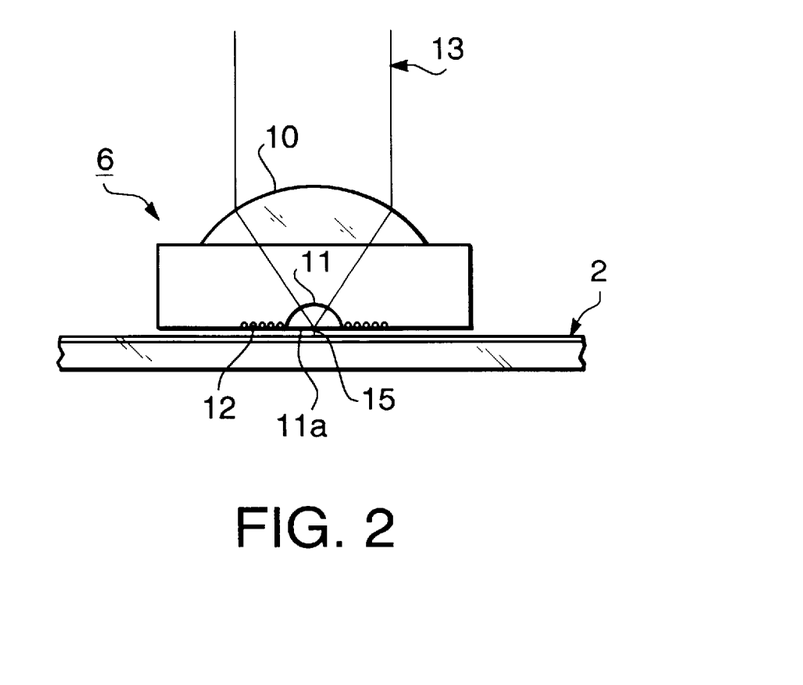
FIG. 2 is an enlarged view of a floating head of the optical disk of FIG. 1.
Figure 3:
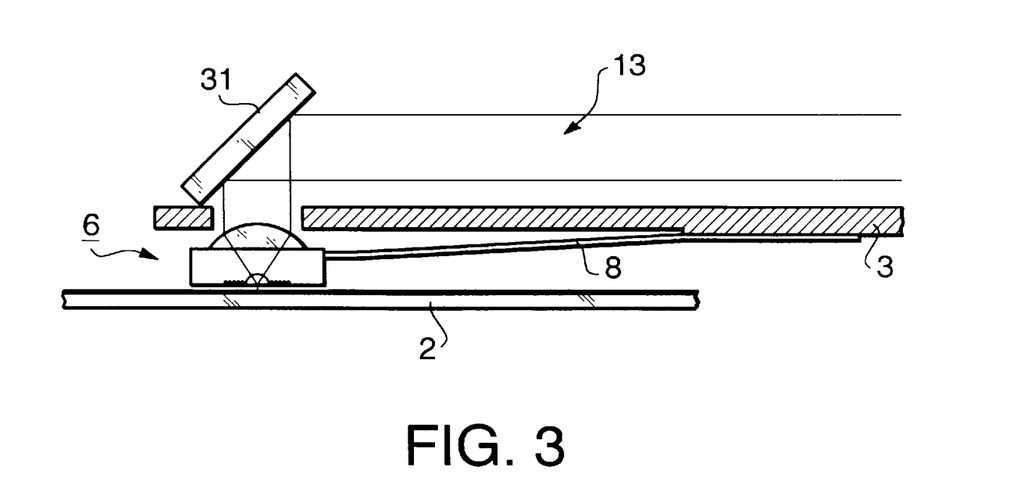
FIG. 3 is an enlarged view of the tip of the rotary arm of the optical disk of FIG. 1.

FIG. 2 is an enlarged view of the floating head 6. FIG. 3 is an enlarged view of the tip of the rotary arm 3. As shown in FIG. 3, the floating head 6 is mounted to the rotary arm 3 via a flexure beam 8. One end of the flexure beam 8 is fixed to the bottom of the rotary arm 3, while the floating head 6 is fixed to the other end of the flexure beam 8. When the optical disk 2 rotates, the floating head 6 is lifted upward by air flow generated between the optical disk 2 and the floating head 6. When the floating head 6 is lifted upward, the flexure beam 8 is elastically deformed, which urges the floating head 6 downward. With this, the floating amount of the floating head 6 is kept constant, due to the balance of the upward force (caused by the air flow) and the downward force (caused by the deformation of the flexure beam 8).

As shown in FIGS. 2 and 3, the floating head 6 includes an objective lens 10 and a solid immersion lens (SIL) 11. A reflecting mirror 31 is provided to the rotary arm 3, which reflects the laser beam 13 emitted from the light source module 7 (FIG. 1) to the objective lens 10. The objective lens 10 converges the laser beam 13. The solid immersion lens 11 is a hemispherical lens and the plane surface thereof is faced with the optical disk 2. Further, the focal point of the objective lens 10 is positioned on the plane surface of the solid immersion lens 11. That is, the laser beam 13 is converged on the plane surface 11a of the solid immersion lens 11. Since the clearance of the optical disk and the plane surface 11a of the solid immersion lens 11 is less than 1 μm, the converged laser beam is converted to a so-called evanescent beam (which propagates across a small gap between closely disposed surfaces) and reaches the optical disk 2. Since the beam diameter of the evanescent beam is smaller than the converged laser beam, a data storage capacity can be remarkably increased.

In order to apply magnetic field on the surface of the optical disk 2, a coil 12 is provided around the solid immersion lens 11. A current flow in the coil 12 generates a magnetic field in which the optical disk 2 is positioned. Data writing is performed by the evanescent beam from the solid immersion lens 11 and the magnetic field generated by the coil 12.

Figure 4:
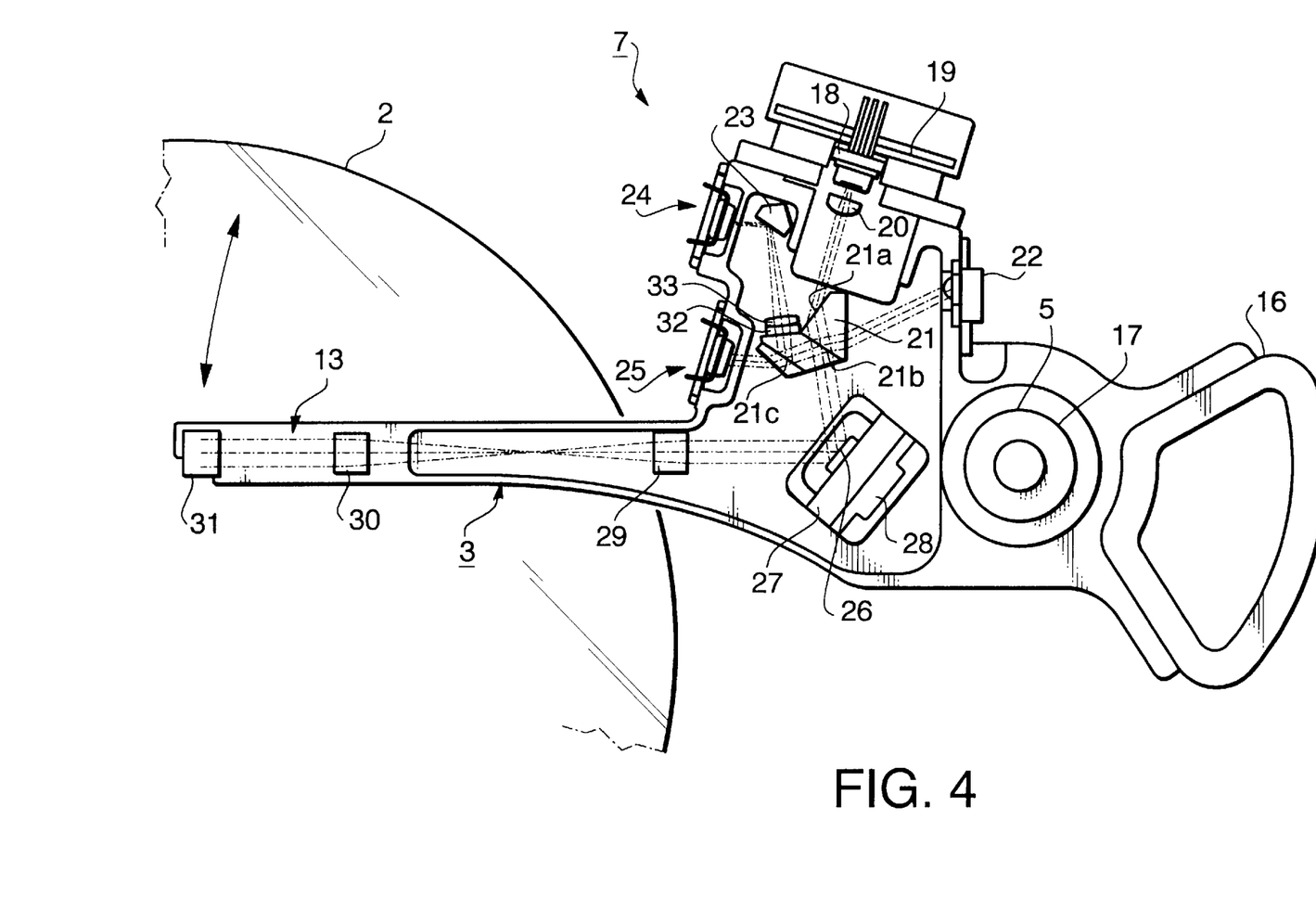
FIG. 4 is a top view of the rotary arm of the optical disk of FIG. 1.
Figure 5:
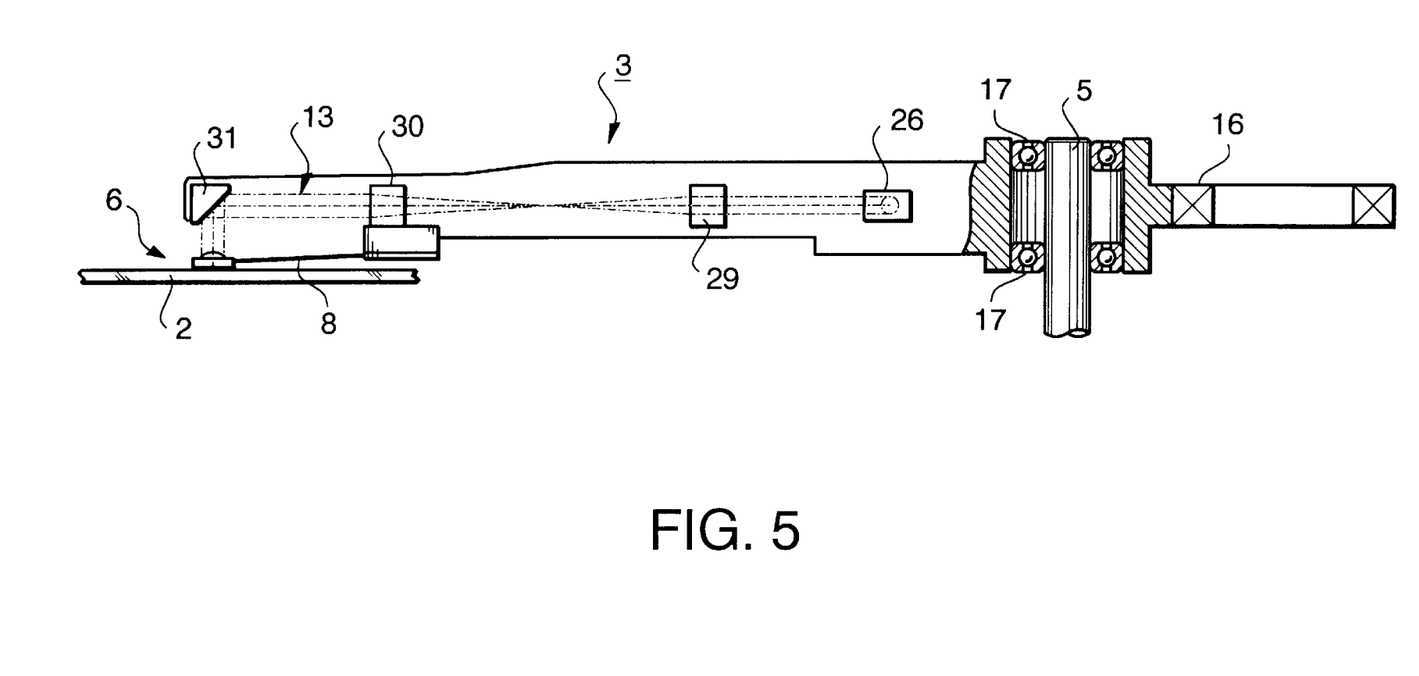
FIG. 5 is a longitudinal sectional view of the rotary arm of the optical disk of FIG. 1.

FIGS. 4 and 5 are a plan view and a sectional view of the rotary arm 3. As shown in FIGS. 4 and 5, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 1). The rotary arm 3 is supported by the shaft 5 via bearings 17. When current flows in the driving coil 16, the rotary arm 3 is rotated about the axis 5, due to the electromagnetic induction.

As shown in FIGS. 4 and 5, the light source module 7 includes a semiconductor laser 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the semiconductor laser 18 is converted to a parallel laser beam by the collimator lens 20. Due to the characteristics of the semiconductor laser 18, the sectional shape of the laser beam is elongated. In order to correct the sectional shape of the laser beam, an incident surface 21a of the composite prism assembly 21 is inclined with respect to the incident laser beam. When the laser beam is refracted by the incident surface 21a of the composite prism assembly 21, the sectional shape of the laser beam becomes a circle. The laser beam enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the semiconductor laser 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disk 2. For this purpose, a galvano mirror 26 is provided in a light path between the light source module 7 and the objective lens 10. In particular, the galvano mirror 26 is locate so that the laser beam 13 emitted from the light source module 7 directly enters. The laser beam 13 reflected by the galvano mirror 26 proceeds to the reflection mirror 31 and is reflected (by the reflection mirror 31) to the floating head 6. Then, the laser beam 13 is converged and incident on the optical disk 2. By rotating the galvano mirror 26, the incident angle of the laser beam 13 incident on the objective lens 10 is changed, so that the light spot on the optical disk 2 is moved. The rotating angle of the galvano mirror 26 is detected by a galvano mirror positioning sensor 28 located in the vicinity of the galvano mirror 26.

When the galvano mirror 26 rotates to change the incident angle of the laser beam 13 incident on the objective lens 10, there is a possibility that the laser beam 13 partially fails to enter the objective lens 10. In order to solve this problem, first and second relay lenses 29 and 30 are provided between the galvano mirror 26 and the reflection mirror 31 to obtain the conjugate relationship between a principal plane of the objective lens 10 and the center of the mirror surface of the galvano mirror 26 (in the vicinity of the rotation axis thereof). With this, the laser beam 13 reflected by the galvano mirror 26 is surely enter the objective lens 10 irrespective of the rotation of the galvano mirror 26.

The laser beam 13 that has returned from the surface of the optical disk 2 travels through the floating head 6, the relay lenses 30 and 29 and the galvano mirror 26. Then, the laser beam 13 enters the composite prism assembly 21 and is reflected by the first half mirror surface 21b to the second half mirror surface 21c. The laser beam that transmits the second half mirror surface 21c is directed to the tracking detection sensor 25. The tracking detection sensor 25 outputs a track error signal based on the incident laser beam. The laser beam that has reflected by the second half mirror surface 21c is split by a Wollaston polarizing prism 32, generating two polarized beams. The polarized beams are converged (by a converging lens 33) on the data detection sensor 24 via reflection prism 23. The data detection sensor 24 has two light receiving portions which respectively receives two polarized beams. With this, the data detection sensor 24 reads data recorded on the optical disk 2. In particular, the data signal from the tracking detection sensor 25 and data detection sensor 24 are generated by a not-shown amplifier circuit and sent to a not-shown control circuit.

[First Embodiment]

Figure 6:
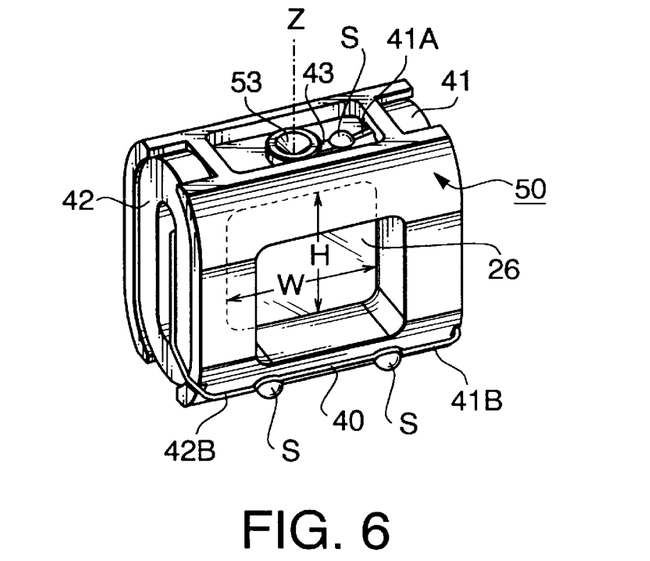
FIG. 6 is a perspective view of a mirror holder according to the first embodiment.
Figure 7:
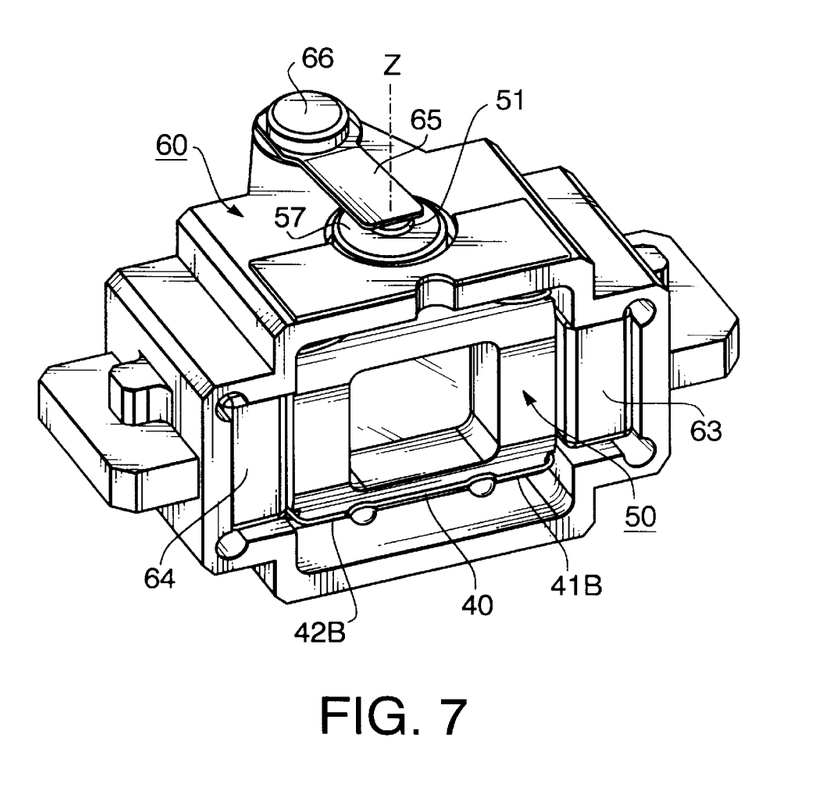
FIG. 7 is a perspective view of a galvano mirror unit according to the first embodiment.

FIGS. 6 and 7 are perspective views of a mirror holder and a galvano mirror unit according to the first embodiment. The galvano mirror 26 is mounted to a mirror holder 50. The mirror holder 50 is supported by a rectangular-shaped stator 60 so that the mirror holder 50 is rotatable about a rotation axis Z. Hereinafter, the direction in parallel to the rotation axis Z is referred to as a vertical direction. Further, a plane that is perpendicular to the rotation axis Z is referred to as a horizontal plane. Further, the galvano mirror 26 side of the mirror holder 50 is referred to as 'front', while the opposite side of the mirror holder 50 is referred to as 'rear'.

As shown in FIG. 6, a pair of coils 41 and 42 are provided to lateral side ends of the mirror holder 50. Further, as shown in FIG. 7, a pair of magnets 63 and 64 are provided to the stator 60. The magnets 63 and 64 generate a magnetic field in which the coils 41 and 42 are positioned. When current flows in the coils 41 and 42, the mirror holder 50 is rotated about the rotation axis Z due to the electromagnetic induction caused by the current and the magnetic field. With such an arrangement, the galvano mirror 26 can be rotated thereby to change the direction of the laser beam reflected by the galvano mirror 26.

As shown in FIG. 6, the galvano mirror 26 is rectangular shaped and has a certain width W and a height H. The rotation axis Z of the galvano mirror 26 is in parallel to the height H of the galvano mirror 26. Further, the rotation axis Z is at the center of the width W of the galvano mirror 26.

Figure 8:
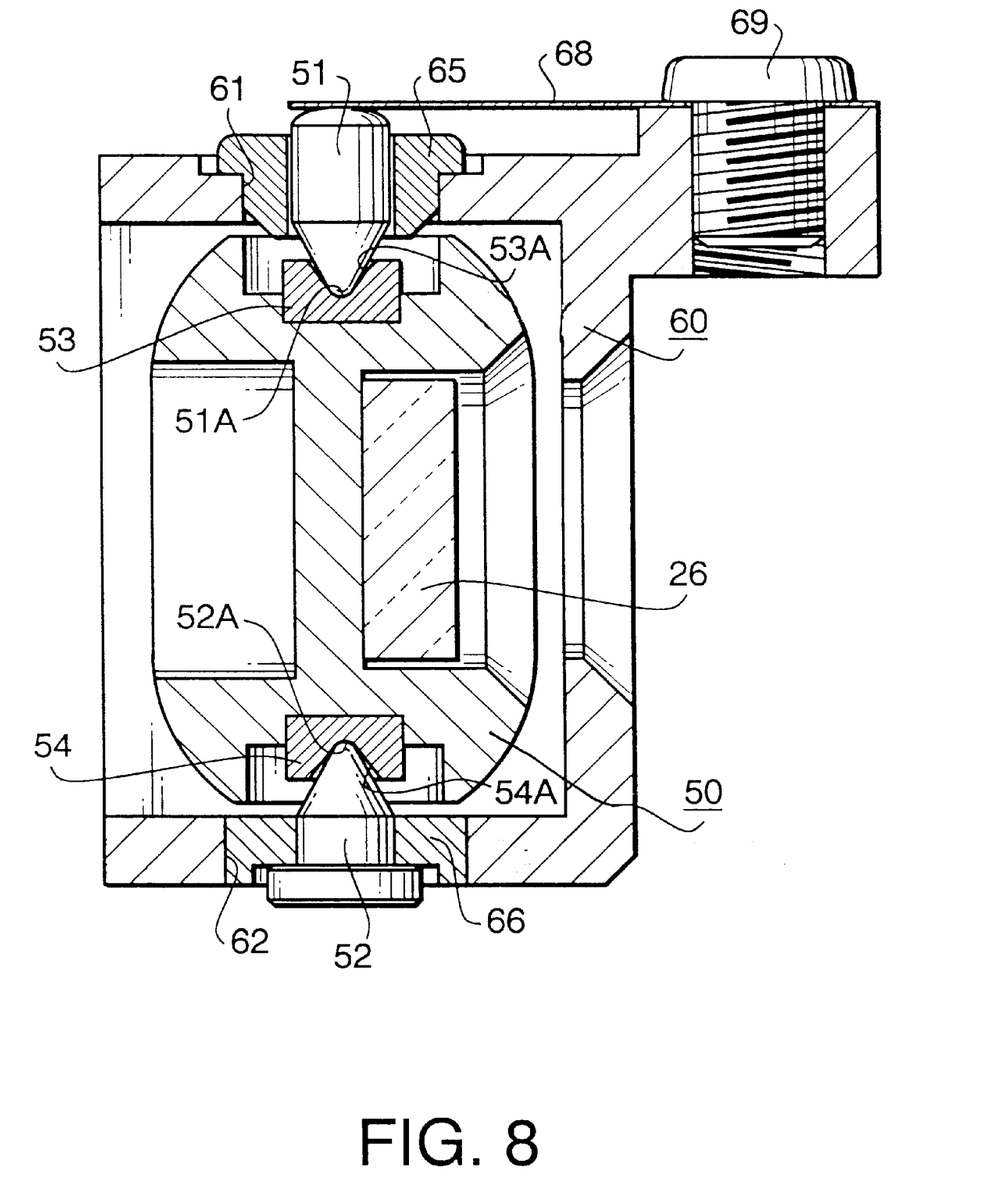
FIG. 8 is a longitudinal sectional view of the galvano mirror unit of FIG. 7.

FIG. 8 is a longitudinal sectional view of the galvano mirror unit. As shown in FIG. 8, in order to rotatably support the mirror holder 50, a pair of center pins 51 and 52 are provided to the stator 60 so that the center pins 51 and 52 vertically sandwich the mirror holder 50. A pair of receive members 53 and 54 are provided at the top and the bottom of the mirror holder 50, which receive the center pins 51 and 52, respectively. The center pins 51 and 52 and the receive members 53 and 54 are aligned on a line defining the rotation axis Z.

The upper center pin 51 has a conical bottom portion with a rounded apex 51A. The receiving member 53 has a recess 53A having a conical surface. The rounded apex 51A of the upper center pin 51 contacts the conical surface of the recess 53A. With this, the upper center pin 51 is received by the receive member 53 so that the receive member 53 is rotatable with respective to the upper center pin 51. The lower center pin 52 and the lower receive member 54 contact in a similar manner to the upper center pin 51 and the upper receive member 53.

The upper center pin 51 is supported by a bushing 65 so that the upper center pin 51 is allowed to move in the axial direction. The bushing 65 fits into an upper hole 61 formed on a top plate of the stator 60. The lower center pin 52 fits into a bushings 66. The bushings 66 fits into a lower hole 62 formed on a bottom plate of the stator 60. The bushings 65 and 66 are made of insulating material.

In order to bias the upper center pin 51 to the upper receive member 53, a plate spring 68 is provided on a top of the stator 60. One end of the plate spring 68 is fixed to the front end of the stator 60 (via a screw 69), while the other end of the plate spring 68 abuts a top of the upper center pin 51. Due to the elastic force of the plate spring 68, the backlash between the center pin 51 (52) and the receive member 53 (54) can be eliminated.

The electrical feeding path of the first embodiment is described. The center pins 51 and 52 and the receive members 53 and 54 are made of conductive materials. The mirror holder 50 is made of insulating material. As shown in FIG. 6, a lead wire 41A of the right coil 41 is connected to a terminal 43 (via a soldering S) formed on a top of the mirror holder 50. The terminal 43 is connected to the upper receive member 53.

Figure 9:
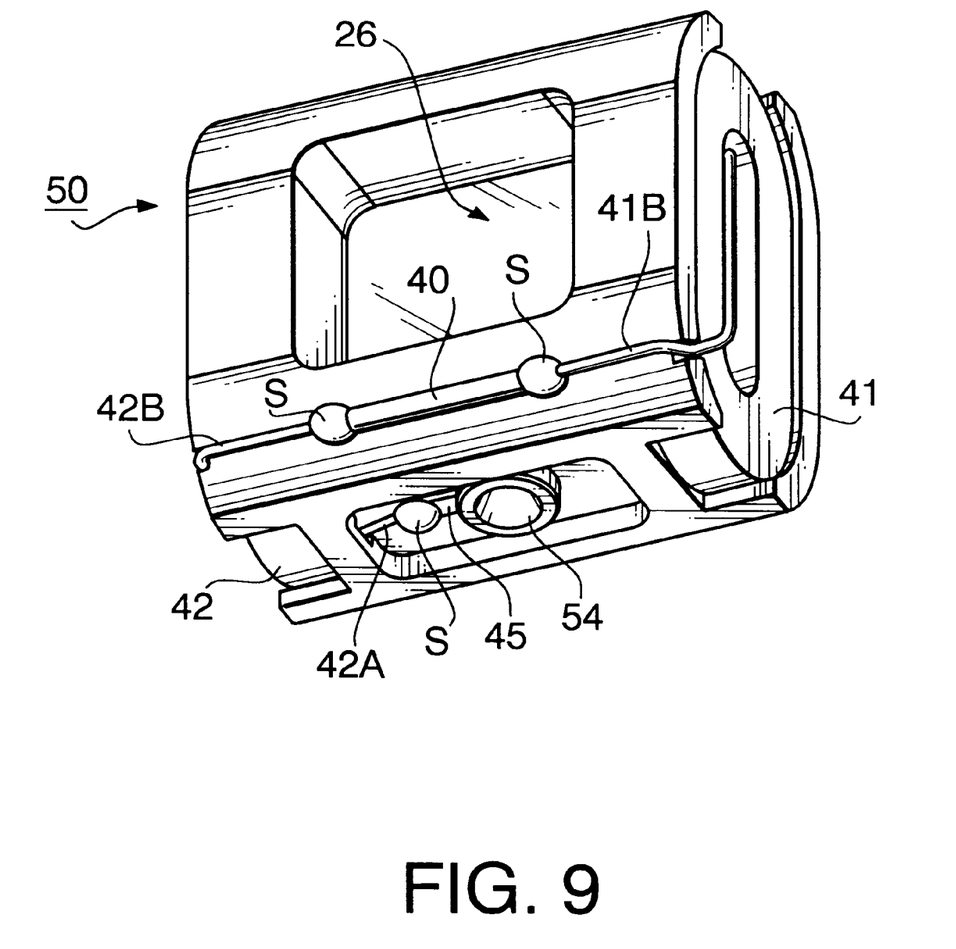
FIG. 9 is a bottom perspective view of the mirror holder of FIG. 6.

FIG. 9 is a bottom perspective view of the mirror holder 50. As shown in FIG. 9, a lead wire 42A of the left coil 42 is connected to a terminal 45 (via a soldering S) formed on a bottom of the mirror holder 50. The terminal 45 is connected to the lower receive member 54. Further, lead wires 41B and 42B of the coils 41 and 42 are connected to a common terminal 40 formed on a front surface of the mirror holder 50.

A plus voltage is applied to the upper center pin 51 and a minus voltage is applied to the lower center pin 52, via not shown wires. Then, current flows through (1) the upper center pin 51, (2) the upper receive member 53, (3) the right coil 41, (4) the common terminal 40, (5) the left coil 42, (6) lower receive member 54 and (7) the lower center pin 52. That is, the center pins 51 and 52 and the receive members 53 and 54 constitute an electrical feeding path for feeding electricity to the coils 41 and 42. Since the bushings 65 and 66 are made of insulating material, the short-circuit between the center pins 51 and 52 are prevented. Since the mirror holder 50 is made of insulating material, the short circuit between the receive members 53 and 54 are prevented.

With such an arrangement, according to the first embodiment, since the center pins 51 and 52 and the receive members 53 and 54 constitute an electrical feeding path, it is not necessary to lay wires between the mirror holder 50 and the stator 60. Thus, the rotation of the galvano mirror 26 is not disturbed by the wires.

In the above described first embodiment, it is possible to make the plate spring 68 of conductive material. With this, the plate spring 68 also can be used for feeding electricity to the coils 41 and 42. Further, it is possible to provide the center pins 51 and 52 to the mirror holder 50 and to provide the receive member 53 and 54 to the stator 60.

Figure 10:
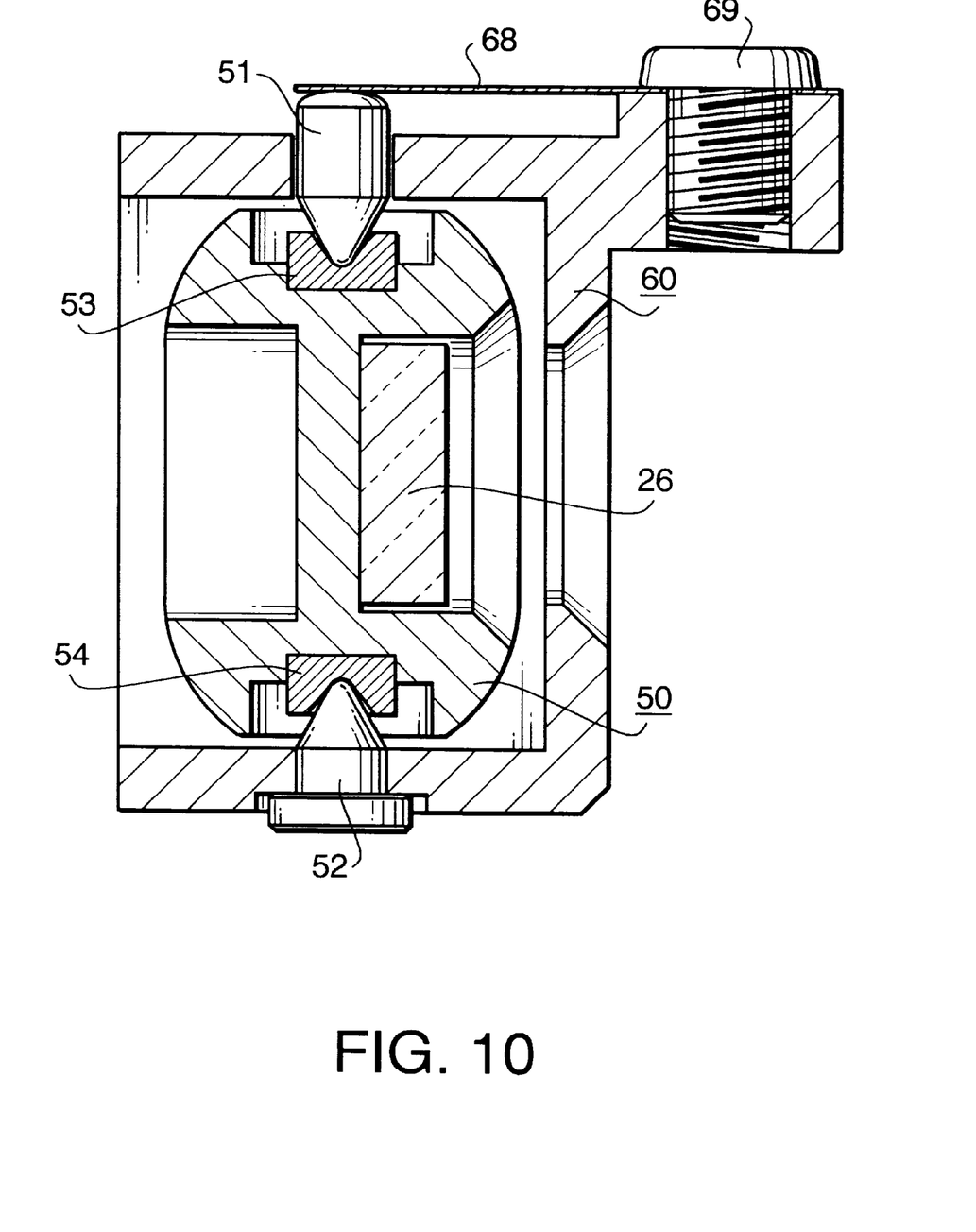
FIG. 10 is a longitudinal sectional view showing a variation of the galvano mirror unit.

Furthermore, it is also possible to make the stator 60 of insulating material. With this, as shown in FIG. 10, the bushing 65 and 66 (made of insulating material) can be eliminated, so that the structure of the stator 60 becomes simple as shown in FIG. 10.

[Second Embodiment]

Figure 11:
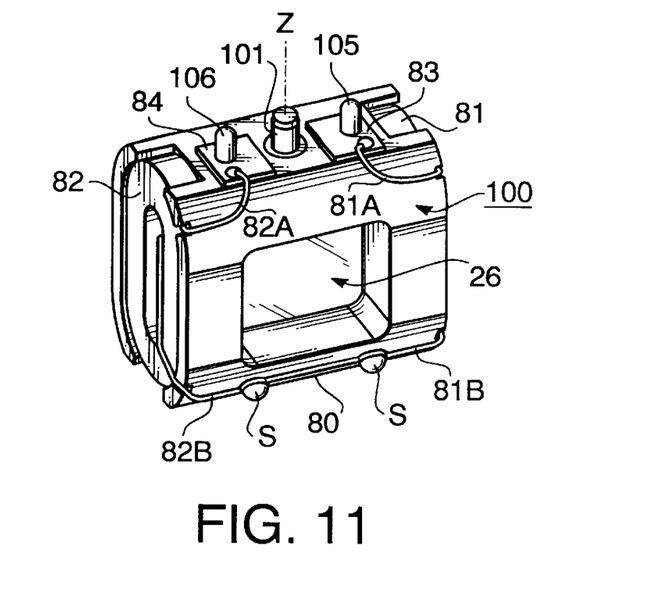
FIG. 11 is a perspective view of a mirror holder according to the second embodiment.
Figure 12:
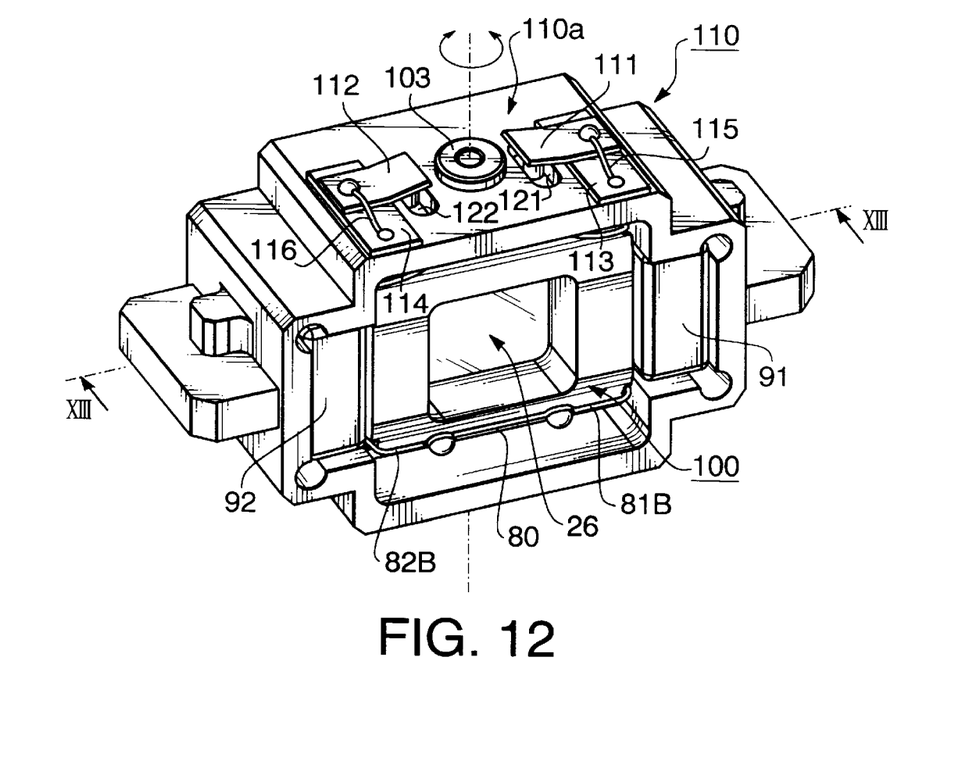
FIG. 12 is a perspective view of a galvano mirror unit according to the second embodiment.
Figure 13:
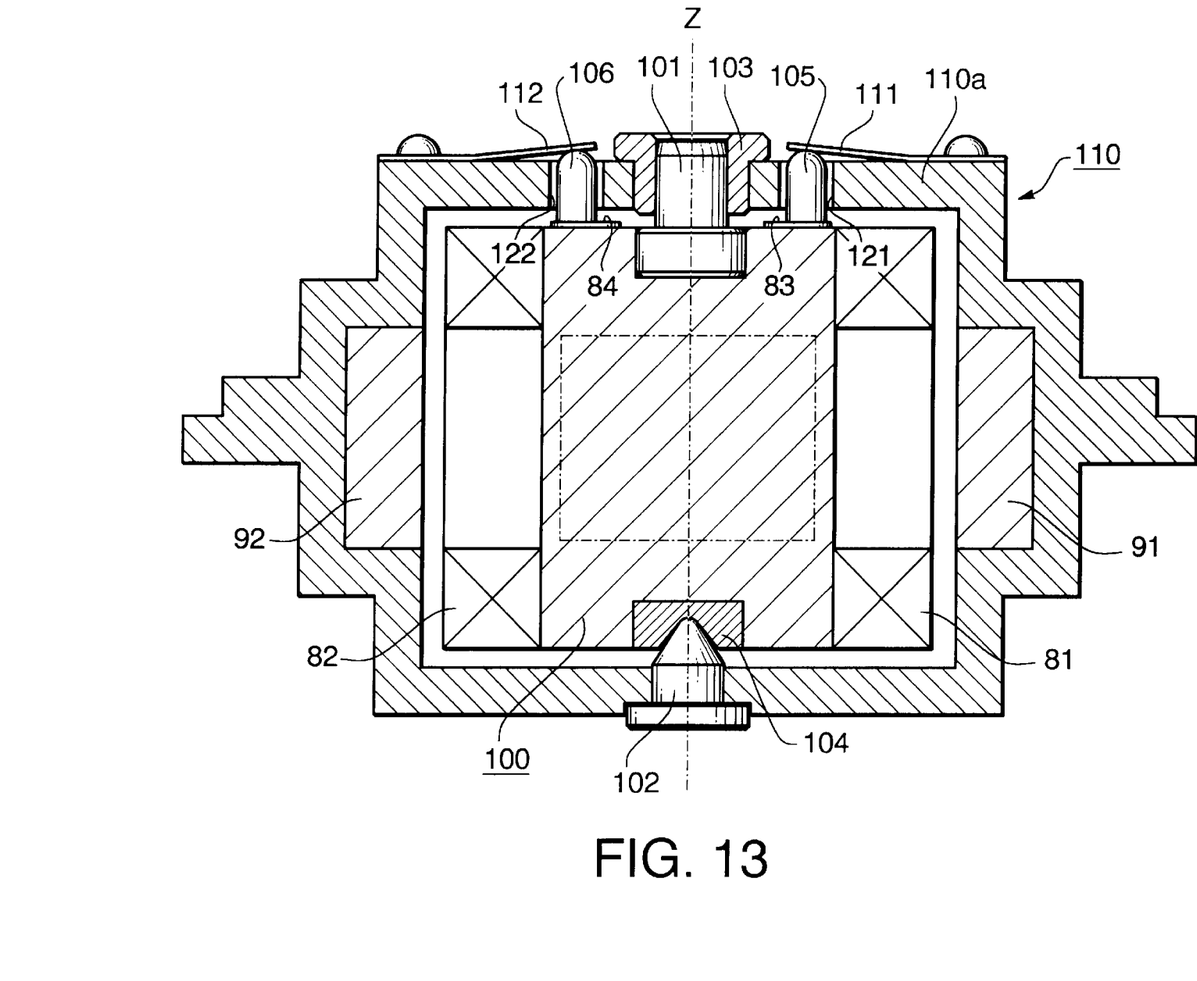
FIG. 13 is a longitudinal sectional view of the galvano mirror unit of FIG. 12.

FIGS. 11 and 12 are perspective views of a mirror holder and a galvano mirror unit according to the second embodiment. FIG. 13 is a sectional view of the galvano mirror unit taken along a line XIII—XIII of FIG. 12.

As shown in FIG. 13, a mirror holder 100 is rotatably supported in a stator 110. The mirror holder 100 and the stator 110 are made of insulating materials. In order to rotatably support the mirror holder 100, an upper center pin 101 is provided to an upper surface of the mirror holder 100. The upper center pin 101 projects upward and is received by a receive member 103 provided to the stator 110. The receive member 103 fits into a hole formed on a top plate 110*a* of the stator 110. Further, a lower center pin 102 is provided to the bottom of the stator 110. The lower center pin 102 projects upward and is received by a receive member 104 provided to the bottom of the mirror holder 100. The center pins 101 and 102 and the receive members 103 and 104 are aligned on a line defining a rotation axis Z.

As shown in FIGS. 11 and 12, a mirror holder 100 has two coils 81 and 82 at lateral side end thereof. Magnets 91 and 92 are provided to the stator 110 so that magnets 91 and 92 are faced with the coils 81 and 82. The mirror holder 100 is rotated about the rotation axis Z due to the electromagnetic induction caused by the current flow in the coils 81 and 82 and a magnetic field caused by the magnets 91 and 92.

A pair of connector pins 105 and 106 are provided on the top surface of mirror holder 100. The connector pins 105 and 106 are located symmetrically with the upper center pin 101. The connector pins 105 and 106 project upward in parallel with each other. The stator 110 has two openings 121 and 122 at the top plate 110*a* thereof, through which the connector pins 105 and 106 project to above the top plate 110*a* of the stator 110. The openings 121 and 122 are elongated so as to allow the movement of the connector pins 105 and 106 according to the rotation of the mirror holder 100. A pair of plate springs 111 and 112 are provided on the top plate 110*a* of the stator 110. The plate springs 111 and 112 respectively urge the connector pins 105 and 106 downward, thereby to eliminate backlash (between the lower receive member 104 and the lower center pin 102).

The electrical feeding path of the second embodiment is described. As shown in FIG. 11, a lead wire 81A of the right coil 81 is connected the connector pin 105 via a base plate 83. A lead wire 82A of the left coil 82 is connected the connector pin 106 via a base plate 84. Lead wires 81B and 82B of the coils 81 and 82 are connected to a common terminal 80 formed on a front surface of the mirror holder 100.

As shown in FIG. 12, two intermediate plate 113 and 114 are provided on the top of the stator 110. The intermediate plates 113 and 114 are respectively attached to the plate springs 111 and 112. Further, halves of the intermediate plates 113 and 114 are exposed, so that not shown cables can be attached to the intermediate plates 113 and 114. Further, the intermediate plate 113 and the plate spring 111 are electrically connected via a short wire 115. Similarly, the intermediate plate 114 and the plate spring 112 are electrically connected via a short wire 116.

A plus voltage is applied to the right intermediate plate 113 and a minus voltage is applied to the left intermediate plate 114, via not shown cables. Then, current flows through (1) the right connector plate 113, (2) the right plate spring 111, (3) the right connector pin 105, (4) the right coil 81, (5) the common terminal 80, (6) the left coil 82, (7) the left connector pin 106, (8) the left plate spring 112, and (9) the left intermediate plate 114. Since the mirror holder 100 and the stator 110 are made of insulating materials, a short-circuit are prevented.

With such an arrangement, according to the second embodiment, since the connector pins 105 and 106 and the plate springs 111 and 112 constitute an electrical feeding path, it is not necessary to lay wires between the mirror holder 100 and the stator 110. Thus, the rotation of the galvano mirror 26 is not disturbed by the wires.

Although the structure and operation of a galvano mirror unit is described herein with respect to the preferred embodiments, many modifications and changes can be made without departing from the spirit and scope of the invention. Particularly, the embodiments can be embodied in any kind of optical disk drive and are not limited to the optical disk drive using the Near Field Recording technology.

The present disclosure relates to subject matters contained in Japanese Patent Application Nos. HEI 09-172060 filed on Jun. 27, 1997 and HEI 09-326937 filed on Nov. 12, 1997 which are expressly incorporated herein by reference in their entirety.

What is claimed is:

1. A galvano mirror unit comprising:
   a galvano mirror;
   a mirror holder holding said galvano mirror;
   a stator in which said mirror holder is rotated about a rotation axis;
   a pair of coils provided to opposing ends of said mirror holder; and
   a pair of pivoting supports which pivotably supports said mirror holder, said pivoting supports sandwiching said mirror holder therebetween in a direction of said rotation axis,
   each of said pivoting supports comprising a stationary part provided to said stator and a movable part provided to said mirror holder, each of said stationary part and said movable part including conductive material;
   said stationary part and said movable part contacting with each other so that said stationary part and said movable part are electrically connected, said movable parts being respectively connected to said coils,
   said movable parts and said stationary parts constituting an electrical feeding path for feeding electricity to said coils.

2. The galvano mirror unit according to claim 1, wherein said stationary parts and said movable parts are made of conductive materials.

3. The galvano mirror unit according to claim 1, said stationary part comprising a center pin, and
   said movable part comprising a receive member which receives said center pin.

4. The galvano mirror unit according to claim 3, wherein said center pin has a rounded tip while said receive member has conical surfaces, and
   wherein said rounded tip of said center pin contacts said conical surfaces of said receive member.

5. The galvano mirror unit according to claim 1, wherein said stationary part and said movable part are supported by insulation members.

6. The galvano mirror unit according to claim 1, further comprising a biasing member provided to said stator,
   wherein said biasing member urges said pivoting supports in a direction of said rotation axis, thereby to remove backlash of said rotation axis.

7. The galvano mirror unit according to claim 1, each of said coils including first and second lead wires, wherein said first lead wires of said coils are connected to a common terminal provided on said mirror holder, and wherein said second lead wires of said coils are respectively connected to said stationary parts.

8. A galvano mirror unit comprising:

a galvano mirror;

a mirror holder holding said galvano mirror;

a stator in which said mirror holder is rotated about a rotation axis;

a pair of center pins made of conductive material and provided to said stator, said center pins sandwiching said mirror holder therebetween in a direction of said rotation axis;

a pair of receive members made of conductive material and provided to said mirror holder, each of said receive member receiving respective center pin; and a pair of coils provided to opposing ends of said mirror holder, said coils being connected to said receive members, wherein said center pins and said receive members constitute an electrical feeding path for feeding electricity to said coils.

9. The galvano mirror unit according to claim 8, wherein said center pins and said receive members are supported by insulation members.

10. The galvano mirror unit according to claim 8, further comprising a biasing member provided to said stator, wherein said biasing member urges one of said center pins in a direction of said axis, thereby to remove backlash.

11. A galvano mirror unit comprising:

a galvano mirror;

a mirror holder holding said galvano mirror;

a stator in which said mirror holder is rotated about a rotation axis;

a pivoting arrangement which pivotably supports said mirror holder;

a pair of coils provided to opposing ends of said mirror holder;

a pair of connector pins provided to said mirror holder, said contact pins being respectively connected to said coils; and a pair of connector plates provided to said stator, said connector plates respectively contacting said connector pins, each of said connector plates has an area so as to cover a moving range of said connector pins.

12. The galvano mirror unit according to claim 11, wherein said connector pins are provided on one of end surfaces of said mirror holder in a direction of said rotation axis.

13. The galvano mirror unit according to claim 12, wherein said connector plates are provided on an outer surface of said stator, and wherein said stator has openings which allow said connector pins to project to said outer surface of said stator.

14. The galvano mirror unit according to claim 13, wherein each of said openings is elongated so as to allow movement of said connector pin according to the rotation of said mirror holder.

15. The galvano mirror unit according to claim 13, wherein said connector plates urge said connector pins in a direction of said rotation axis.

16. The galvano mirror according to claim 13, said pivoting arrangement comprising:

a pair of center pins provided to said stator, said center pins sandwiching said mirror holder therebetween in a direction of said rotation axis; and a pair of receive members provided to said mirror holder, each of said receive member receiving respective center pin.

17. The galvano mirror unit according to claim 11, each of said coils including first and second lead wires, wherein said first lead wires of said coils are connected to a common terminal provided on said mirror holder, and wherein said second lead wires of said coils are respectively connected to said connector pins.

18. The galvano mirror according to claim 11, wherein said connector pins are located symmetrically with said rotation axis.

19. The galvano mirror according to claim 11, wherein said mirror holder is made of insulating material.

20. The galvano mirror according to claim 11, wherein said stator is made of insulating material.

* * * * *